(No Model.)

D. S. BRADBERRY.
HEEL SWEEP SET FOR PLOWS.

No. 470,469. Patented Mar. 8, 1892.

WITNESSES
F. L. Durand.
E. K. Stewart.

INVENTOR
David S. Bradberry.
by John S. Duffie
Attorney

UNITED STATES PATENT OFFICE.

DAVID SALATHIA BRADBERRY, OF BOLEMAN, SOUTH CAROLINA.

HEEL-SWEEP SET FOR PLOWS.

SPECIFICATION forming part of Letters Patent No. 470,469, dated March 8, 1892.

Application filed September 22, 1891. Serial No. 406,433. (No model.)

*To all whom it may concern:*

Be it known that I, DAVID SALATHIA BRADBERRY, a citizen of the United States, residing at Boleman, in the county of Anderson and State of South Carolina, have invented certain new and useful Improvements in Heel-Sweep Sets; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to heel-sweep sets for plows; and it consists in the novel construction and arrangement of its parts.

Figure 1:
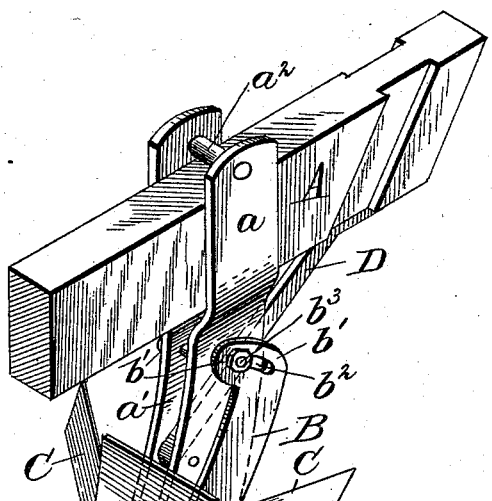
Figure 2:
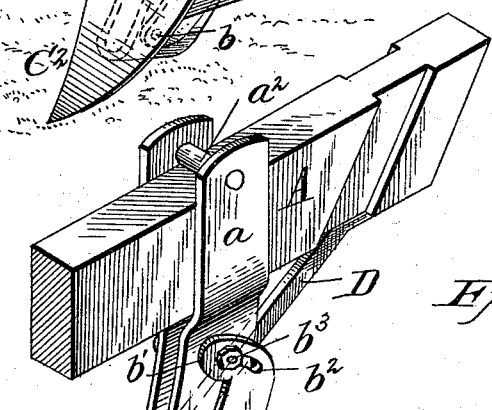
Figure 3:
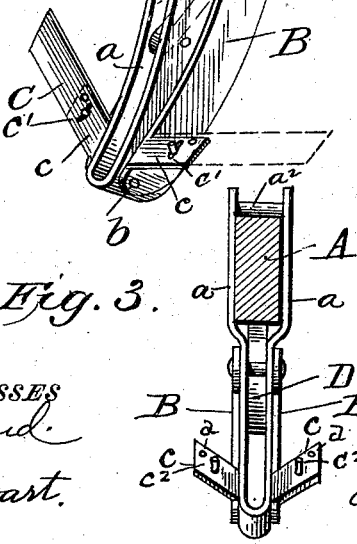

In the accompanying drawings, Figure 1 is a perspective view of my invention. Fig. 2 is perspective view of the same with the plow-point and one sweep removed. Fig. 3 is a front view of my invention with the plow-point and both sweeps removed.

My invention consists of the plow-foot $a$, made of suitable material with perforations or having between the two sides a slot $a'$, the upper end or ends of the piece being secured by a bolt $a^2$, which passes over the beam A. The foot is braced by the rod D, one end of which is secured to the plow-beam and the other to the foot. On each side of the foot, pivoted near its lower end, is a flat bar B, their upper ends terminating in the heads $b'$. Said heads are provided with the circular slots $b^2$, which are adapted to receive the bolt $b^3$, which passes entirely through the plow-foot and is secured at each end by a nut.

The lower ends of the side bars B are provided with the flanges $c$, which are each provided with bolt $c^2$ and perforation $d$, and to these flanges are secured bolts $c^2$, passing through the circular slots $c'$ of the sweeps C. (See Figs. 2 and 3.) Said sweeps are provided with slots $c'$, which work on bolts $c^2$, secured in said flanges $c$, so that said sweeps may have their upper ends turned up or down at will, and so secured.

In the lower part of the foot $a$ is secured the plow-plate $c^3$ by a bolt and nut, the bolt passing through the space between the two sides of the foot. This plow-plate is thus adapted to be adjusted in the ordinary manner.

It will be observed that the sweeps C, by means of the slots $b^2$ and $c'$, can be thrown forward or backward and upward and downward and fixed in any position by tightening the nuts on the bolts $b^3$ and $c^2$.

The object of this invention is to construct a plow with sweeps that can be made to shovel or rake like the blade of a hoe, just as the nature of the soil or the stage of growth of the crop may require.

Having described my invention, what I claim as new, and desire to secure by Letters Patent, is—

In a plow, the foot $a$, the brace D, one end secured to the said foot and the other to the beam, side bars B, having perforations $b$, circular slots $b^2$, and perforated flanges $c$, the lower ends of said bars pivoted to the lower end of said foot, bolt $b^3$, working in the said slots $b^2$ and passing through the said foot, and perforated sweeps C, pivoted to the said flanges and having circular slots $c'$ working on the bolts $c^2$, all substantially as shown and described, and for the purposes set forth.

In testimony whereof I affix my signature in presence of two witnesses.

<div style="text-align:center">
his<br>
DAVID × SALATHIA BRADBERRY.<br>
mark
</div>

Witnesses:
  W. H. FRIERSON,
  J. M. PAYNE.